May 20, 1969 L. P. V. PACK ET AL 3,445,599

TELEPHONE ALARM WITH PRERECORDED CONTROL SIGNALS ON ONE MEDIA AND DIAL AND MESSAGE SIGNALS ON ANOTHER MEDIA

Filed July 6, 1965

United States Patent Office
3,445,599
Patented May 20, 1969

3,445,599 TELEPHONE ALARM WITH PRERECORDED CONTROL SIGNALS ON ONE MEDIA AND DIAL AND MESSAGE SIGNALS ON ANOTHER MEDIA

Leonard Peter Venner Pack, Olde Tyles, London Road, Sunningdale, Berkshire, England, and Eric Edward Elliott, 67 Winchgrove Road, Bracknell, Berkshire, England Filed July 6, 1965, Ser. No. 469,701
Int. Cl. H04m 11/04
U.S. Cl. 179—5 11 Claims

ABSTRACT OF THE DISCLOSURE

Alarm apparatus for use with detector switches which apparatus comprises internal lines adapted to be connected into public telephone lines, disconnecting switches in the said internal lines, first and second recording media having signal patterns thereon, first and second play back means adapted to produce signals in response to the signal patterns, detecting means for detecting when a detector switch is closed and consequently closing the said disconnecting switches and actuating the said play back means, and means operable (a) in response to a first signal from the first play back means to so connect the internal lines that a dialling signal from the second play back means may be passed to the public telephone lines and (b) in response to a second signal from the first play back means to so connect the internal lines that a message signal from the second play back means may be passed to the public telephone lines. The signal patterns on the first and second recording media are arranged so that a dialling signal is produced by the second play back means while the first signal is produced by the first play back means and a message signal is produced by the second play back means while the second signal is produced by the first play back means.

This invention relates to alarm systems.

According to this invention there is provided apparatus having internal lines adapted to be connected into public telephone lines, which apparatus comprises disconnecting switches in the said interal lines, first and second recording media having signal patterns thereon, first and second play back means adapted to produce signals in response to patterns on the first and second recording media respectively, detecting means for detecting when a detector switch is closed and consequently closing the said disconnecting switches and actuating the said play back means, and means operable (a) in response to a first signal from the first play back means so to connect the internal lines that a dialling signal from the second play back means may be passed to the public telephone lines and (b) in response to a second signal from the first play back means so to connect the internal lines that a message signal from the second play back means may be passed to the public telephone lines, the signal patterns on the first and second recording media being arranged so that a dialling signal is produced by the second play back means while the first signal is produced by the first play back means and a message signal is produced by the second play back means while the second signal is produced by the first play back means.

Preferably the apparatus comprises an open circuit sensing means for sensing an open circuit in the public telephone lines when the said disconnecting switches have been closed. Preferably the open circuit sensing means is arranged to operate alarm signalling means if said open circuit is sensed.

Preferably the apparatus comprises ringing sensing means for sensng a ringing voltage on the public telephone lines when said disconnecting switches have been closed. The ringing sensing means may be arranged to inhibit the actuation of the play back means, or it may be arranged to operate alarm signalling means, when the ringing voltage is sensed.

The apparatus preferably comprises a single drive motor.

Preferably the first and second recording media are carried by a single member which is preferably a twin track magnetic tape. The message signal is preferably a spoken message.

The second signal produced by the first play back means is preferably produced when there is no signal pattern on the first recording medium.

An example of the invention will now be described with reference to the accompanying drawings, in which.

Figures 1, 2, 3:
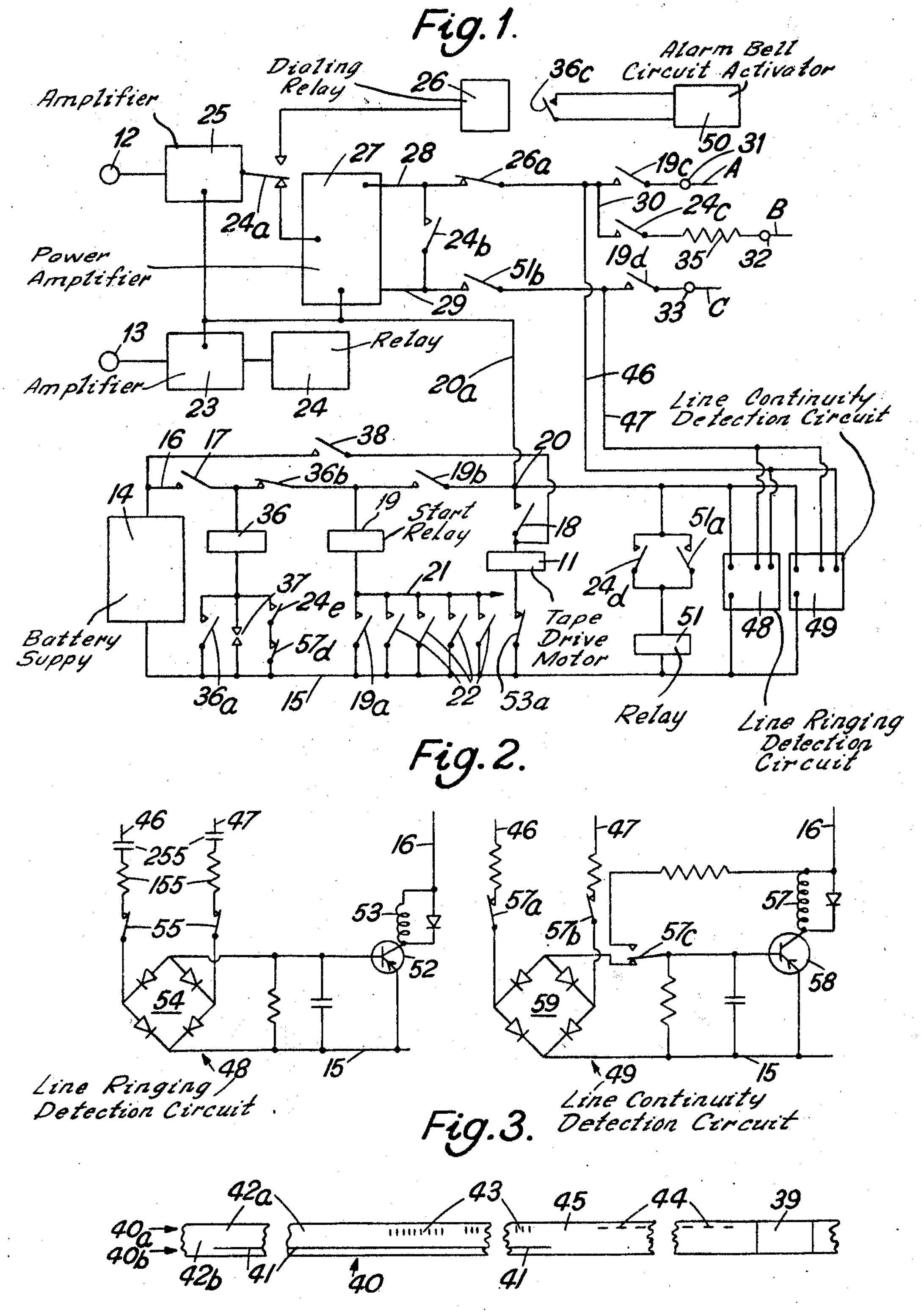
FIGURE 1 is a block diagram of a burglar alarm device of the invention.
FIGURE 2 is a circuit diagram of two of the blocks of FIGURE 1.
FIGURE 3 is a diagram of the pattern recorded on the magnetic tape of the devices.

Referring to the drawings, a burglar alarm device of the invention comprises a battery operated twin track tape reproducer having a tape drive motor 11 and two tape heads 12, 13 for converting the magnetic pattern recorded on a tape 40 into electrical signals, one head 12 for the upper track and the other head 13 for the lower track.

The tape drive motor 11 is connected to a battery supply 14 through lines 15, 16 by a manually operable switch 18 and a normally closed contact **53*a*. The line 15 is direct, and the line 16 includes a switch 17 ganged to the switch 18, a normally closed contact 36*b*, and a normally open contact 19*b*. A start relay 19 is connected to the line 16 between contacts 19*b* and 36*b* and to a line 21. Between the line 21 and the line 15 is the parallel arrangement of a normally open contact 19*a* and a number of alarm switches 22** fitted to doors and windows in the premises to be guarded.

A stop relay 36 is connected to the line 16 between the contact **36*b* and switch 17 and through normally open contacts 36*a* and 37 in parallel to the line 15. A relay 51 is connected through normally open contacts 24*d* and 51*a* in parallel to a terminal 20 on the line 16 on the side of the contact 19*b* remote from the supply 14. A switch 38 shunts the switches 17, 18 and the contacts 36*b* and 19*b***.

The lower track tape head 13 is connected to an amplifier 23 whose output is fed to a relay 24. The upper track tape head 12 is a connected to an amplifier 25 whose output is fed through a contact **24*a* normally to a power amplifier 27 and alternatively to a dialling relay 26. A line 20*a* supplies power from the terminal 20 on line 16 to the amplifiers 23, 25 and 27**.

Lines 28, 29 and 30 connect the output of the amplifier 27 to the public telephone lines A, B and C, at terminals 31, 32 and 33. The line 28 connects one output terminal of the amplifier 27 to the terminal 31 through a normally closed contact **26*a* and a normally open contact 19*c*. The line 29 connects the other output terminal of the amplifier 27 to the terminal 33 through normally open contacts 19*d* and 51*b*. The line 30 connects the junction of the contacts 26*a* and 19*c* to the terminal 32 through a normally open contact 24*c* and a 50 ohm resistor 35. A normally open contact 24*b* is connected across the lines 28, 29 at the output terminals of the amplifier 27**.

A line ringing detection circuit 48 and a line continuity detection circuit 49 are connected across the lines 16, 15 for energisation and are connected to the lines 28, 29 between the contacts **26*a* and 19*c* and between the contacts 51*b* and 19*d* respectively. The circuits 48 and 49 are shown in detail in FIGURE 2. The circuit 48 includes a relay 53 in series with a transistor switch 52 across the lines 15, 16. The connecting lines 46, 47 from the lines 28, 29 contain normally closed contacts 55, resistors 155 and capacitors 255 and a full wave rectifying bridge 54. The direct potential output of the bridge 54 is applied to the base of the transistor switch 52**.

The circuit 49 includes a relay 57 in series with a transistor switch 58 across the lines 15, 16. The connecting lines 46, 47 from the lines 28, 29 include normally closed contacts **57*a*, 57*b* respectively and a full wave rectifying bridge 59. The direct potential output of the bridge 59 connected through a two position contact 57*c* in its normal position to the base of the transistor switch 58. In its alternative position the contact 57*c* shunts the base of switch 58 to the line 16** through a resistor.

In this description the contacts operated by each relay are denoted by the reference number of the operation relay followed by a letter. On energisation of the relay, the contacts associated with the relay are moved from their normal positions.

The magnetic pattern recorded on the tape 40 is shown diagrammatically in FIGURE 3. The upper track **40*a* has a fifteen second silent period 42*a* to allow for the acquisition of the dialling tone, followed by pulses 43 corresponding to the dialling of the emergency services, e.g., "999." The pulses 43 recorded on the tape are slightly shorter than those required to be applied to the telephone lines to allow for the inertia of the relay 26. After a further short silent section 45 the upper track 40*a* contains a recorded spoken message 44 giving notice of the burglary. This message is preferably repeated a certain number of times, to allow for the first transmission not being completely received at the emergency station, for example, if the call were not answered immediately. The lower track 40*b* has a continuous tone 41 recorded upon it from an initial four second silent period 42*b* to the end of the dialing pulses 43** on the upper track. Thereafter the lower track is clear.

The alarm device is set by closing the ganged switches 17, 18. As soon as the lines 15 and 21 are shorted together by the momentary closing of an alarm switch 22, the relay 19 is energised and closes the contact **19*a* to continue the shorting together of the lines 15 and 21 until the power supply to the relay 19 is broken by the opening of the contact 36*b*. The contact 19*a* thus acts as a holding contact. The contact 19*b* is also closed on energisation of the relay 19 and thereby supplies power to the tape drive motor 11 through contact 53*a*, and to the amplifiers 23, 25 and 27 and the circuits 48 and 49**.

Normally, the exchange supplies a direct potential across the terminals 31 and 33. If the station is being called by another, an alternating potential will appear across those terminals, and no potential will appear if the lines to the exchange have been cut.

On closure of the contacts **19*c* and 19*d* the direct potential will be passed to the bridge 59 of the circuit 49 whose output then closes switch 58 and energises the relay 57. The relay 57 holds itself energised by the contact 57*c* and disconnects the circuit from the lines 46 and 47 by opening the contacts 57*a* and 57*b*. The contact 57*d*** is also opened.

If the intending burglar is attempting to prevent the notification of the emergency services by making a telephone call to the station at the premises to be burgled, his calling signal will be passed by the capacitors 255 to the bridge 54 whose output closes the switch 52 and energises the relay 53, and opens the contact **53*a*. The energisation of the tape drive motor 11 and the consequent operation of the alarm will be delayed by the opening of the contact 53*a*** until the station ceases to be called.

When he continuous tone 41 is reproduced by the lower track head 13, the amplifier 23 energises the relay 24. The consequent movement of the contact **24*a* connects the amplified dialling pulses 43 from the upper track amplifier 25 to the dialling relay 26, so that the dialling pulses are amplified and energise the relay 26. The closure of the contact 24*d* energises the relay 51 which is then held energised by its holding contact 51*a*. The contact 51*b* is also closed to complete the closing of the line 29. The contact 24*c* closes to shunt the 50 ohm resistor 35 across the public telephone lines A and B, across which the Post Office bell is connected. The contact 24*b* closes to short the lines 28, 29 at the amplifier 27. The contact 24*e* closes, but normally has no effect as the contact 57*d* has been opened when the direct potential from the exchange was sensed by the circuit 49**.

When the dialling pulses 43 on the top track **40*a* are reproduced, the contact 26*a*** is opened according to the recorded pulse pattern and when so opened breaks the short circuit across the public telephone lines A and C.

At the end of the dialling, the continuous tone 41 on the lower track **40*b* ceases, so that the relay 24 is deenergised and its contacts are released. The output of the amplifier 25 is now applied by the contact 24*a* to the amplifier 27. The short circuit across the lines 28 and 29 is disconnected so that the spoken message 44 from the upper track 40*a*** can be applied to the public telephone lines A and C.

A metal foil 39 on the tape 40 is driven past the contacts 37 at a suitable time to connect the relay 36 to hte line 15 and thereby to energise it. The contact **36*a* closes to hold the relay 36 energised and the contact 36*b* opens to break the power supply to the remainder of the equipment described above thus disconnecting the equipment from the public telephone lines A and C by opening the contacts 19*c* and 19*d*. A third contact 36*c* is closed to energise an independent circuit 50** operating alarm bells (not shown).

If the contact **57*d* is still closed when the contact 24*e* closes as described above, for example, if the public telephone lines have been cut, the relay 36 will be energised as soon as the continuous tone 41 is reproduced from the lower track 40*b*** of the tape, and the steps of the preceding three paragraphs will be omitted. In this case the alarm device operates as a normal burglar alarm, sounding alarm bells without previously notifying the emergency services.

Since the operation of the alarm device can be postponed indefinitely if the station is called continuously, a further normally open contact **53*b* may be connected in parallel with the contacts 37 so that the alarm bells are sounded if the station is being called when the relay 24** is operated. The emergency services are not in this case notified by telephone.

The alarm device is reset by opening the switches 17 and 18 so that the relay 36 is released. The tape 40 may be rewound by closing switch 38.

The detector switches 22 can, for example, be contacts closed by the unauthorised opening of a door or window or can, for example, be bimetallic switches closed by the heat of a fire. The tape reproducer apparatus is more robust than a gramaphone record reproducer, and may continue to work even if it has been displaced by an explosion, for example.

We claim:

1. Alarm apparatus for use with detector switches which apparatus comprises internal lines adapted to be connected into public telephone lines, disconnecting switches in the said internal lines, first and second recording media having signal patterns thereon, first and second play back means adapted to produce signals in response to patterns recorded on the first and second recording media respectively, detecting means for detecting when a detector switch is closed and consequently closing the said disconnecting switches and actuating the said play back means, and means operable (a) in response to a first signal from the first play back means to so connect the internal lines that a dialling signal from the second play back means may be passed to the public telephone lines and (b) in response to a second signal from the first play back means so to connect the internal lines that a message signal from the second play back means may be passed to the public telephone lines, the signal patterns on the first and second recording media being arranged so that a dialling signal is produced by the second play back means while the first signal is produced by the first play back means and a message signal is produced by the second play back means while the second signal is produced by the first play back means.

2. Apparatus as claimed in claim 1 wherein the first and second recording media are carried by a single member.

3. Apparatus as claimed in claim 2 wherein the single member is a twin track magnetic tape.

4. Apparatus according to claim 1 wherein the message signal is a spoken message.

5. Apparatus as claimed in claim 1 wherein the first play back means is arranged to produce the second signal in the absence of a signal pattern on the first recording medium.

6. Apparatus as claimed in claim 1 comprising an open circuit sensing means for sensing an open circuit in the public telephone lines when the said disconnecting switches have been closed.

7. Apparatus as claimed in claim 6 wherein the open circuit sensing means is arranged to operate alarm signalling means if said open circuit is sensed.

8. Apparatus as claimed in claim 1 comprising ringing sensing means for sensing a ringing voltage on the public telephone lines when said disconnecting switches have been closed.

9. Apparatus as claimed in claim 8 wherein the ringing sensing means is arranged to inhibit the actuation of the play back means when the ringing voltage is sensed.

10. Apparatus as claimed in claim 8 wherein the ringing sensing means is arranged to operate alarm signalling means when the ringing voltage is present.

11. Apparatus as claimed in claim 1 comprising a single drive motor for driving both recording media past the corresponding play back means.

References Cited

UNITED STATES PATENTS

| | | | |
|---|---|---|---|
| 2,827,515 | 3/1958 | Zuber. | |
| 3,072,746 | 1/1963 | Zimmerman. | |
| 3,188,392 | 6/1965 | Ferrell | 179—5 |

ROBERT L. GRIFFIN, *Primary Examiner.*

W. S. FROMMER, *Assistant Examiner.*